US006178410B1

(12) United States Patent
Kunde et al.

(10) Patent No.: US 6,178,410 B1
(45) Date of Patent: *Jan. 23, 2001

(54) ARRANGEMENT FOR COMMUNICATION BETWEEN STATIONS OF A MAIL PROCESSING MACHINE

(75) Inventors: Christoph Kunde; Marcus Kruschinski; Hasbi Kabacaoglu, all of Berlin (DE)

(73) Assignee: Francotyp-Postalia AG & Co., Birkenwerder (DE)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/041,469

(22) Filed: Mar. 12, 1998

(30) Foreign Application Priority Data

Mar. 13, 1997 (DE) ........................................ 197 11 997

(51) Int. Cl.[7] ........................................ G06F 17/00
(52) U.S. Cl. ........................................ 705/406; 705/410
(58) Field of Search ........................................ 705/406, 407, 705/410; 700/9, 11, 28, 40, 169, 213, 215, 216, 217, 218, 219, 220, 221, 222, 223, 224, 225, 226, 227, 228, 229, 230

(56) References Cited

U.S. PATENT DOCUMENTS 4,253,158 2/1981 McFiggans .............................. 380/23
4,301,507 11/1981 Soderberg et al. .................. 705/410
4,746,234 5/1988 Harry .............................. 400/120.01
5,008,827 4/1991 Sansone et al. ..................... 705/409
5,200,903 4/1993 Gilham ................................ 705/408
5,206,812 4/1993 Abumehdi ............................ 705/410
5,815,660 9/1998 Momona ............................. 709/208

FOREIGN PATENT DOCUMENTS 0 718 802 12/1995 (EP) .
0 744 713 5/1996 (EP) .

OTHER PUBLICATIONS

Champlin, Leslie; "Virtual postage may bring real savings in time, money"Dec. 1999, Kansas City Business Journal, v18, n13, p15; DialogWeb copy pp. 1–3.*

* cited by examiner

*Primary Examiner*—Edward R. Cosimano
*Assistant Examiner*—Thomas A. Dixon
(74) *Attorney, Agent, or Firm*—Schiff Hardin & Waite

(57) ABSTRACT

In an arrangement for communication between a base station and further stations of a mail processing machine and for the emergency shut-off thereof, two interfaces are provided per station in order to connect two neighboring stations as an interface and the mail processing machine is fashioned so as to be expandable in unlimited fashion toward both sides. The control arrangement is programmed to evaluate the incoming message or to forward it to the other interface when it is not directed to the receiving station. Hardware and software stages are provided so that every station can activate an emergency shut-off of all stations via an emergency off-line.

12 Claims, 8 Drawing Sheets

TERMINAL CONTACTS

TERMINAL CONTACTS

ARRANGEMENT FOR COMMUNICATION BETWEEN STATIONS OF A MAIL PROCESSING MACHINE

BACKGROUND OF THE INVENTION

1. Field of the Invention

The present invention is directed to a mail processing machine of the type having a number of individual stations arranged in succession for conveying postal matter from station-to-station in order to process the postal matter, and in particular to an arrangement for communication among the stations of such a mail processing machine.

2. Description of the Prior Art

A mail processing machine of this type is suitable for processing filled letters of different formats given moderate through large shipping quantities. The structure composed of stations enables an economic adaptation to different customer demands. The system fashioned for communication can be operated as franking system, shipping system or postal matter evaluation system and can be quickly shut down in case of emergency.

Above a medium through higher number of letters or other postal matter to be sent, postage meter machines are utilized in a standard way for franking the postal matter. For example, U.S. Pat. No. 4,746,234 is directed to a thermal transfer postage meter machine that is surrounded by a secured housing.

U.S. Pat. No. 5,200,903 discloses connections of a personal computer or a work station via a multi-path cable to a peripheral postage meter machine that contains an accounting and control module (meter) and a printer, both for printing the franking stamp and for printing the receiver address. A modem is connected to the personal computer. The personal computer functions as a communication means and assumes the calculation of the respective postage fees for the individual items to be shipped on the basis of stored postage fee schedule tables. The peripheral accounting module is relieved of this calculating-intensive and memory-intensive function. An additional scale must be connected to the postage meter machine if the weight of the letter cannot be calculated by the personal computer on the basis of the letter content. The accounting module of the postage meter machine includes a processor system with postage memories and undertakes the accounting, and the directly connected control module controls the printing of address and franking stamp. The low working speed of the overall system is disadvantageous. The working speed is determined by the data transmission rate of the connection between the input/output part of the personal computer as well as by the accounting module. Moreover, it is up to the user to assure that the envelopes are printed with the correct value, or with the correct address. These solutions thus do not allow the automatic processing of filled letters having different thicknesses and different formats. A fast, automatic processing of mixed mail with postage fees that change from letter to letter is thus practically precluded.

Given a higher volume of mail, a mail processing system with postage meter machines, possibly together with other mail handling devices, is likewise utilized in a mail center for franking postal matter (see German Patent Applications 196 17 586.0, 196 17 473.2, 196 17 476.7, 196 17 557.7, respectively corresponding to pending U.S. application Ser. No.08/850,805, Ser. No.08/850,413, and Ser. No. 08/850,051, assigned to the same Assignee as the present application, whereby a scanner scans a bar code from the envelope in order to acquire an input information. This solution requires a computer-supported system in the office for prior application of the bar code onto the envelope. The postage meter machine controls the other devices accordingly. An intelligent scale for automatic postage calculation is also included.

Some mail processing machines are thus composed of stations having built-in intelligence. In general, such a mail processing machine is composed of a number of devices, for example of an automatic feeder station, a dynamic scale, a postage meter machine and a letter deposit. The devices are either centrally controlled or enter into communication with one another.

If, however, the number of connectable devices has an upper limit, an additional auxiliary device cannot be connected. Later customer needs for an auxiliary station, and thus for a flexible mail processing machine, then cannot be satisfied, merely for reasons of connection and control of the base station.

Given an increasing number of devices, each of which can be equipped with its own user interface, i.e. with its own display and with its own keyboard, the probability increases that error messages that are not overly serious are overlooked. Such error messages, however, can lead to further errors that can only be eliminated with a high expenditure of time.

When an error occurs, for example, because a device was opened, the respective device usually switches the supply voltage off. Corresponding, legal guidelines exist so that the user is protected against harm. When such an error occurs during a mail processing cycle, then a paper jam can arise when the postage meter machine is stopped but preceding devices continue to work for some time. The postal matter is crumpled or even destroyed given such jams. It is particularly time-consuming to eliminate such jams. Every malfunction has an especially disadvantageous effect, particularly given mail processing machines with a high mail processing volume.

SUMMARY OF THE INVENTION

An object of the present invention is to provide a mail processing machine which eliminates the disadvantages of the prior art and to create a more flexible mail processing machine that is composed of physically separate stations. These stations should enable a maximum adaptation to customer wishes and should be capable of being arbitrarily added. In particular, arbitrary, other devices should be connectable without these devices having to be equipped with their own man/machine user interface. The mail processing machine should include a postage meter machine base station that allows the processing of filled letters having different thickness and different format given medium to high shipping quantities. A paper jam should be prevented under all conditions as well, given a mail processing machine composed of a number of stations.

The stations of the mail processing machine—including the base station—therefore should be fashioned for communication with further stations and an emergency shutdown of the mail processing machine should be capable of being initiated with a high level of dependability in case of an emergency.

The inventive mail processing machine is composed of at least one automatic feeder station and a printing machine base station. It is possible to operate such an arrangement as a shipping system or as a postal matter evaluation system, or the aforementioned base station can serve as a postage meter machine in a franking system. The system can be supplemented by a dynamic scale that is inserted between the automatic feeder station and the printing base station, i.e. to the "left" of the printing base station. It can also be advantageously equipped with a letter deposit to the "right" of the base station. Moreover, the invention allows at least one further station with end plug to be inserted to the "right" of the printing base station. When an intelligent periphery device is likewise inserted, the status thereof can be determined with an arrangement for communication between a base station and further stations of a mail processing machine, being determined by the base station. The control of one or all of the stations is optionally fashioned so that a single activation line from the base station can activate a turn-on of all stations.

In order to properly end operation of the system given an unforseen malfunction—such as, for example, the outage of an interface—, a status line (called emergency off-line is conducted through all stations. The mail processing machine can be expanded in unlimited fashion toward both sides and is fashioned so that an emergency shutdown of all stations can be activated by every station via the one emergency off-line. To that end, the controller is connected to the emergency off-line and to an emergency off-logic of a station with the emergency off-line and with at least one actuator of the station. Such an emergency off-line leads from the postage meter machine base station through all stations and back to the postage meter base station and forms an emergency off-loop. A line interruption is recognized immediately with this emergency off-loop by a corresponding evaluation in the corresponding logic or controller of the stations. Via the emergency off-line, each station can activate an emergency shutdown of all stations by utilizing appropriate hardware or software means. This has the advantage that the dependability is assured (error dependability) even when the communication fails. An additional communication with a parallel or serial interface has the advantage that more detailed information can be sent to the postage meter machine with a protocol. The control of the stations is programmed to interpret the respective incoming message at one interface or to forward it to the other interface when it is not directed to the receiving station. Preferably, a data cable connects two neighboring stations as an interface. Only when all apparatuses are in faultless condition is the franking procedure activated or continued. A paper jam can thus be avoided. If a data cable plug becomes unplugged, the logic at the emergency off-line switches of the actuators of all stations in terms of hardware. This is also advantageous given voltage outage, when the processor or a controller of the appertaining station no longer properly functions.

The postage meter machine inventively contains at least one communication channel chain. Two devices that are physically directly adjacent one another are connected as an interface by at least one bidirectional communication channel in the data cable. The hardware outlay is extremely low since only extremely short distances must be traversed in order to connect the devices, and only at most two serial interfaces are required per device. Nonetheless, an unlimited expandability of the mail processing machine is established by appropriate stations. The communication occurs only with the direct neighbor in the chain. An especially simple and efficient handshaking with respect to the earliest possible continued conveying of the postal matter thus can be realized.

Each data set contains the recipient and, optionally, the sender. It is thereby advantageous that every station in the chain knows from where the message originates. Moreover, a routing of the message is possible in a simple way: if it is designated "for me", then the message is not forwarded; if designated "not for me", then it is forwarded to the next device in the chain. Each device thus can communicate with every other device. Specific device addresses allow the addressing of virtually all devices according to specific tasks for which it is not determined what device will assume what sub-task. It is especially advantageous that each station can add its own parameters to a data set if these have not yet been identified. The length of the data set that is sent to neighboring stations is variable. An optimum utilization of the bandwidth of the communication channel thus is achieved. Each module can, as warranted, also display its own display masks on a central display via this interface. The entire system can thus be controlled with only one central display and one central keyboard. The mail processing machine can be arbitrarily expanded by suitable stations in the mail processing direction, i.e., toward the right, or opposite the mail processing direction, i.e., toward the left.

Advantageously, medium through high shipping quantities can be processed with a specific postage meter machine base station. A printhead for a purely electronic printing, together with a transport unit, forms a franking printing station that is tolerant of different postal matter thicknesses. The invention enables a processing of large quantities of mixed mail on the basis of filled letters. The base unit is coupled to the meter via a specific interface unit. The connection to the print electronics of the postage meter machine base station is produced from the meter via a specific, serial high-speed channel.

The individual, controllable stations are, for example, respectively connected to one another with a data cable as an interface.

The automatic feeder station interfaces with the dynamic scale via a first data cable and the dynamic scale interfaces with the postage meter machine base station via a second data cable, and the postage meter machine base station interfaces with the meter.

The meter is equipped with another serial interface which operates only at medium-speed, and with a slow serial interface. The medium-speed serial interface includes a sensor/actuator control and opto-coupler in order to control the postage meter machine base station via a processing unit. The slow serial interface includes a UART circuit and opto-coupler in order to control the other, individually controllable stations of the mail processing machine via a transmission circuit of the V24 interface unit.

The transmission circuit of the V24 interface unit includes a plug jack for the data plug and a level converter that implements a conversion of TTL signals for a V24 interface that is connected to a V24 jack in the postage meter machine base unit.

DESCRIPTION OF THE PREFERRED EMBODIMENTS

Figure 1:
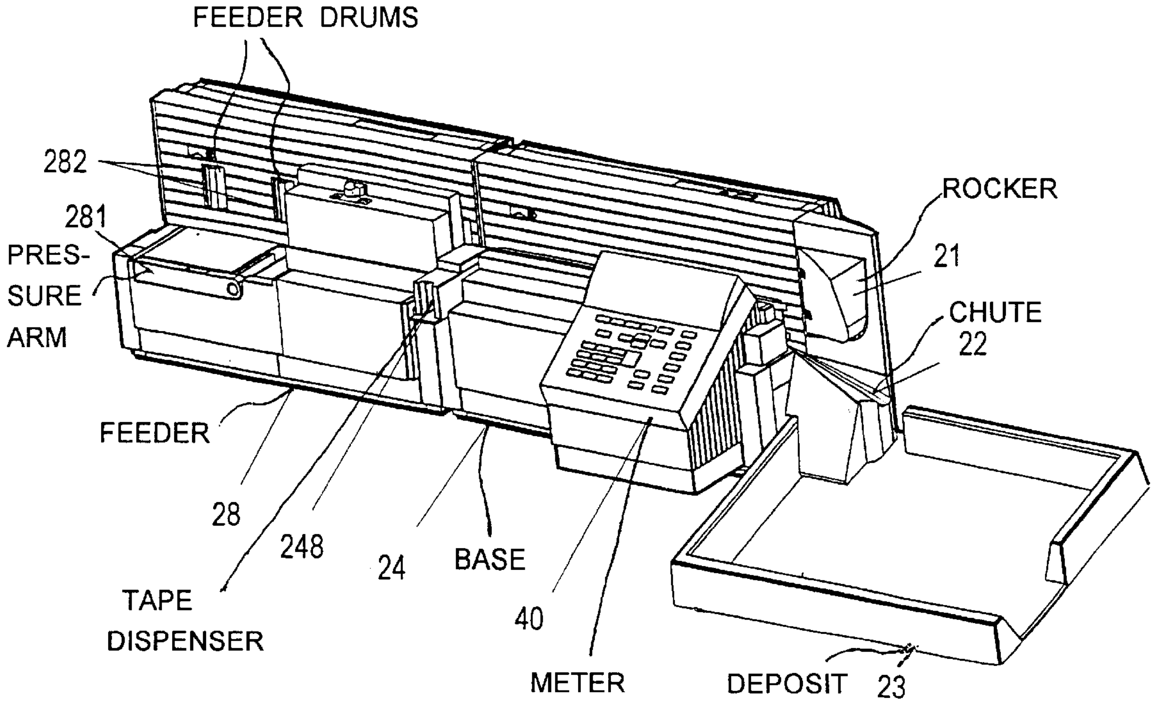
FIG. 1 is a perspective view of an inventive mail processing machine with an automatic feeder station, a postage meter machine base station and a letter deposit.

FIG. 1 shows the mail processing machine in a perspective view. An automatic feeder station 28 is connected at the postal matter input side. For example, the automatic feeder station 28 can automatically apply an envelope to the mail input of the postage meter machine base station 24. It may include an arrangement (not shown) of an automatic letter moistening and closing unit. The postal matter to be franked is placed vertically on a seating surface. The stack of postal matter to be franked is resiliently pressed against a seating surface with a pivotable pressure arm 28.1, with a feeder drum 28.2 driven with a motor projecting therefrom. The feeder drum 28.2 effects a separation of the items of postal matter and is disclosed in greater detail in German Application 196 05 017.0, corresponding to pending U.S. application Ser. No. 08/790,978.

In the postage meter machine base station 24, the letters are conveyed on edge, inclined slightly backward, to the franking printing station of the base 24 by a circulating conveyor belt 242 (See FIG. 9) equipped with pressure elements 243. The conveyor belt 242 with the pressure elements 243 is driven via a drum 244 and forms the letter conveying unit of the postage meter machine base 24. Together with the franking printhead 82, this letter-conveying unit of the postage meter machine base 24 forms the franking printing station. The start of the letter is recognized by a sensor 247 immediately in front of the franking printing station. An optical sensor 247 is preferably arranged in the guide plate 240. The envelope or package or franking tape is conveyed by the letter-conveying unit preceding, within and following the franking printing station. The letters lie against a guide plate 240 in which at least one window 241 is provided and in which at least one ink printhead 82 is permanently installed for the printing. When the conveyor belt 242 with pressure elements 243 moves, an incursion part 245 or, an excursion part 246 engages into continuations of the pressure elements 243 in order to form a clamp for the letter, or in order to open it for supplied letters or, respectively, for letters to be output.

Such a base station for a postage meter machine is disclosed in detail in German Applications 19 605 014 and 19 605 015.

An envelope is conveyed in the postage meter machine base station 24 by the conveyor belt 242 in the aforementioned way and is printed on its side facing away from an observer. Preferably, the mail processing machine is supplemented by a letter deposit 23. Given employment of a conventional letter deposit, the letters would have the printed side lying down, so that ongoing visual inspection is not possible. An arrangement for the deposit of recording media is therefore disclosed in German Patent Application 195 05 089.1, with which a reliable guidance of envelopes that also differ in size and thickness and a turn-over (flipping) of the envelopes is achieved, so that the franking imprint can be easily seen on the deposit envelope. Following the printing station, the envelope passes a chute 22 and is deflected by a rocker 21 in order to drop into a box of the letter deposit 23. For franking thicker postal matter, the mail processing machine has a tape dispenser 91 for self-adhesive franking tapes.

Together with further, individually controllable stations 27 and 28, the postage meter machine base station 24 forms an arbitrarily expandable mail processing machine, whereby the individual, controllable stations 27 and 28 are connected to one another with a data cable 25 as an interface.

Figure 2A:
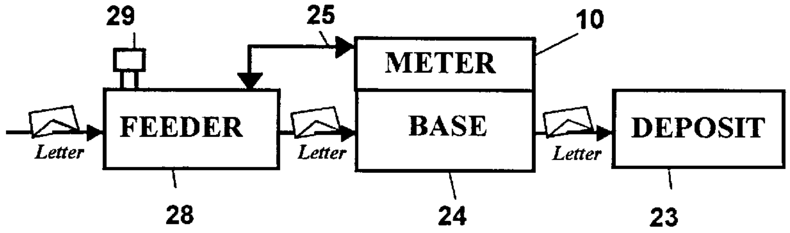
FIG. 2*a* is schematic diagram of the mail processing machine of FIG. 1.

FIG. 2*a* shows a general schematic diagram for the version of the mail processing system of FIG. 1. The mail processing machine is composed of the automatic feeder station 28 that is connected at the postal matter input side, the postage meter machine base station 24 and the letter deposit 23 which is connected at the postal matter output side. The individually controllable station 28 allows an automatic feed of postal matter, particularly mixed mail, and, in particular, automatically applies an envelope to the mail input of the postage meter machine base station 24. The automatic feeder station 28 interfaces in terms of interface to the postage meter machine base station 24 via a data cable 25. The meter 10 thus controls the postage meter machine base station 24 and the automatic feeder 28.

Figure 2B:
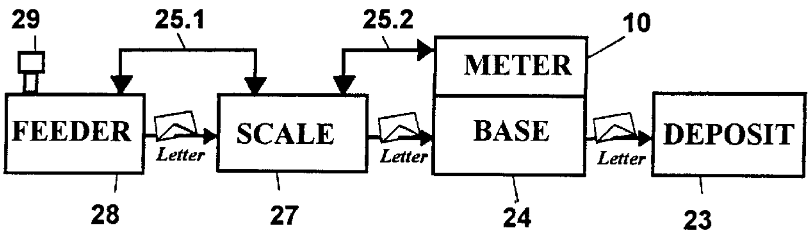
FIG. 2*b* is a schematic diagram of the mail processing machine of FIG. 2*a* supplemented by a dynamic scale.

FIG. 2*b* shows an expanded version of the mail processing system as a schematic diagram. The system has an automatic feeder 28, supplemented by a dynamic scale 27, a postage meter machine base station 24 controlled by the meter 10. The automatic feeder 28 separates letters from a stack and conducts them to the postage meter machine base station 24, i.e., serves as a letter application unit. When the letter stack contains letters of different letter weights that respectively require different postage, the additional employment of the dynamic scale 27 becomes meaningful in order to identify the respective letter weights. The dynamic scale 27 allows a higher throughput of different postal matter (mixed mail) for an automatic mail processing.

Figure 3A:
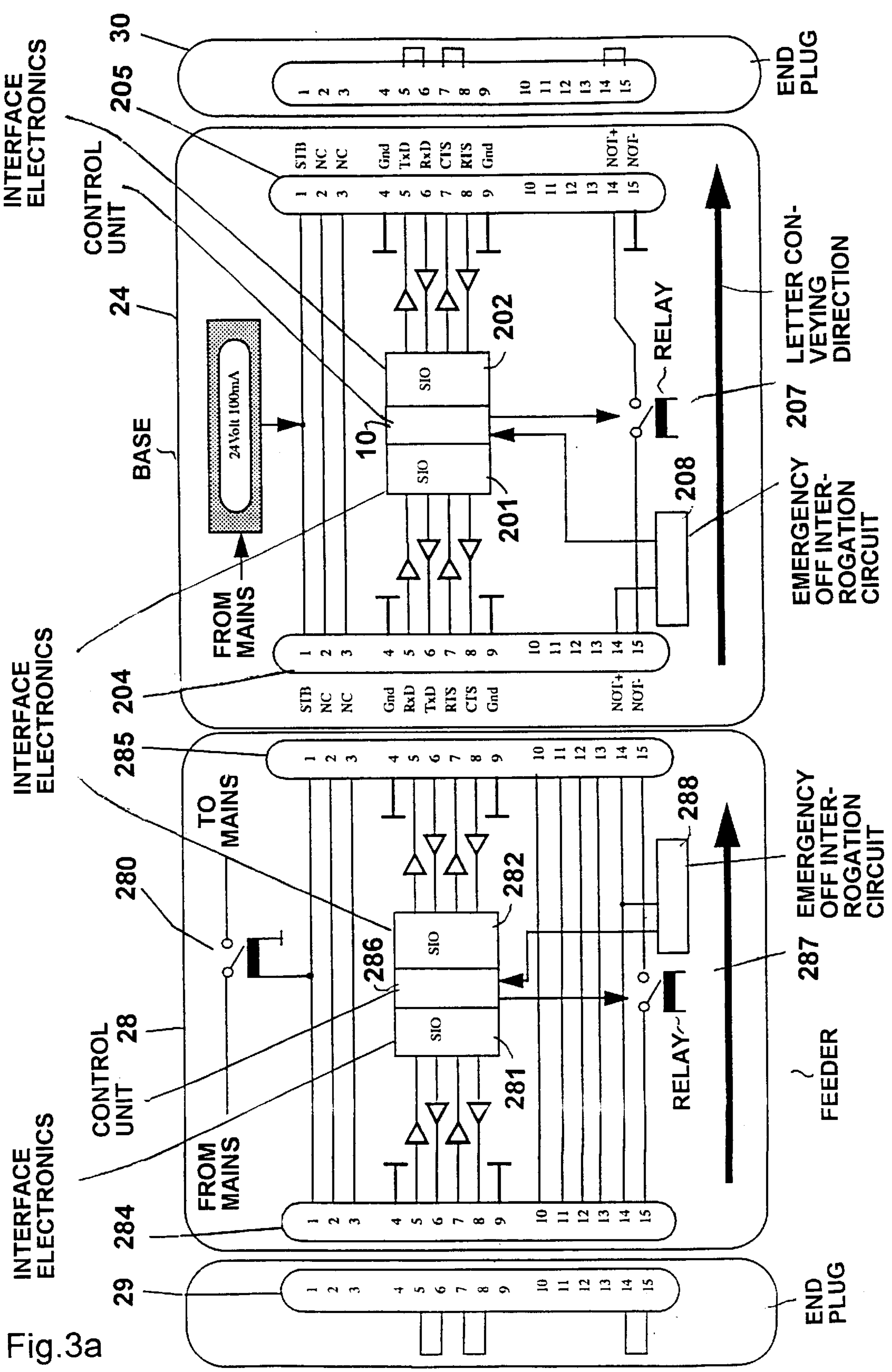
FIG. 3*a* is a block circuit diagram of the first version according to FIG. 2*a*.

FIG. 3*a* shows a block circuit diagram of the first version of the invention according to the arrangement of the stations shown in FIG. 2*a*. The automatic feeder station 28 has terminal contacts 284 and 285 at each side. The pins 1 of the terminal contacts 284 and 285 connect a turn-on line that is switched to a predetermined voltage level for turning the overall system on, this preferably ensuing upon turn-on of the postage meter machine base station 24 when voltage from the power pack is applied to the turn-on line, i.e., to the pins 1, and thus is also applied to a relay 280 in the station 28 connected between the line and ground potential. The relay 280 actuates an appertaining switch that switches the power supply of the station 28 on. The terminal contact 284 is connected to an end plug 29 at the postal matter input side that connects the emergency off-lines NOT+ and NOT− into a loop via the pins 14 and 15. The postage meter machine base station 24 likewise has terminal contacts 204 and 205 at each side. An end plug 30 is plugged to the terminal contact means 205 at the postal matter output side, this end plug 30 connecting the emergency off-lines NOT+ and NOT− to form a loop via the pins 14 and 15, whereby NOT− is connected to ground potential. The letter deposit 23 at the postal matter output side has no electronics. The automatic feeder station is preferably connected to the postage meter machine base station 24 via a data cable 25, shown in FIG. 2*a*. The meter 10 thus controls the postage meter machine base station 24 and the automatic feeder 28. Preferably, each intelligent station has interface electronics at each side; for example, the station 28 has interface electronics 281 at the left side and interface electronics 282 at the right. Serial interface electronics are utilized and the meter 10 of the postage meter machine base station 24 is programmed such that device configuration information is sent to every station after the installation in order to control the communication sequence via the serial interface. Each station 28 or 24 also has respective emergency off-logic 283 and 203 connected to a control unit 286 or the meter 10, respectively. The emergency off-logic 283 and 203 are respectively composed of relays 287 and 207 driven by the meter 10 or the control unit 286 in order to trigger the emergency shutdown by interrupting the emergency off-loop. For example, the triggering can ensue when a corresponding circuit 288 or 208 for emergency off interrogation signals an interruption. Schmitt-triggers are preferably utilized for this purpose. The aforementioned relays can be at least partially replaced by electronic switches, as is explained more specifically below for the exemplary embodiment with reference to FIG. 3*d*.

Beginning in the postage meter machine, the emergency off-line NOT− proceeds through all peripheral devices. The emergency off-line NOT+ is in turn returned to the postage meter machine in the opposite direction of the device at the end of the chain—an automatic feeder station 28 in this case. By means of an impressed current, the postage meter machine can recognize whether the loop is in a proper condition (Z1) or the loop current is interrupted or diverted by a malfunction (Z2 through Z4). In the malfunction cases Z2 through Z4, the actuators are immediately turned off by hardware in each unit (feed station 28, scale 27 and postage meter machine 24). This prevents a letter jam from arising due to continued feed from the automatic feeder station 28 or scale. The overall system can only switch back into the normal operating mode when the emergency off-line is switched into condition Z1. In order to specify the malfunction cases Z2 through Z4 more precisely, information as to why the emergency off-line was activated is communicated to the postage meter machine via a serial interface with a protocol.

The individual errors together with their causes and the condition of the emergency off-line as well as the appertaining message that is sent via the serial interface are listed in the following table.

| Error | Cause | Cell Emergency off-line | Message |
|---|---|---|---|
| Z1 | | Inactive; current loop closed | Normal Operation |
| Z2 | Housing was opened | active; current loop; short-circuit through station | Housing of station xx opened |
| Z3 | Station was separated from the system | Active; current loop; opened | The preceding station communicates that the next station can no longer be reached |
| Z4 | Computer in the station cannot be addressed | Active; current loop; short-circuit through the postage meter machine | No communication possible |

When the emergency off-line is activated by some device/station or other, then the actuators of all stations are stopped and wait for a new instruction of the postage meter machine. A paper jam and the constant running of the motors in case of malfunction is thus prevented. The aforementioned instructions are communicated via the serial V24 interface (pins 4 through 9 of the terminal contact). Each end plug 29 and 30 interconnects the serial data lines to form a loop at the pins 5 and 6 (or 7 and 8) of the terminal contacts.

Figure 5:
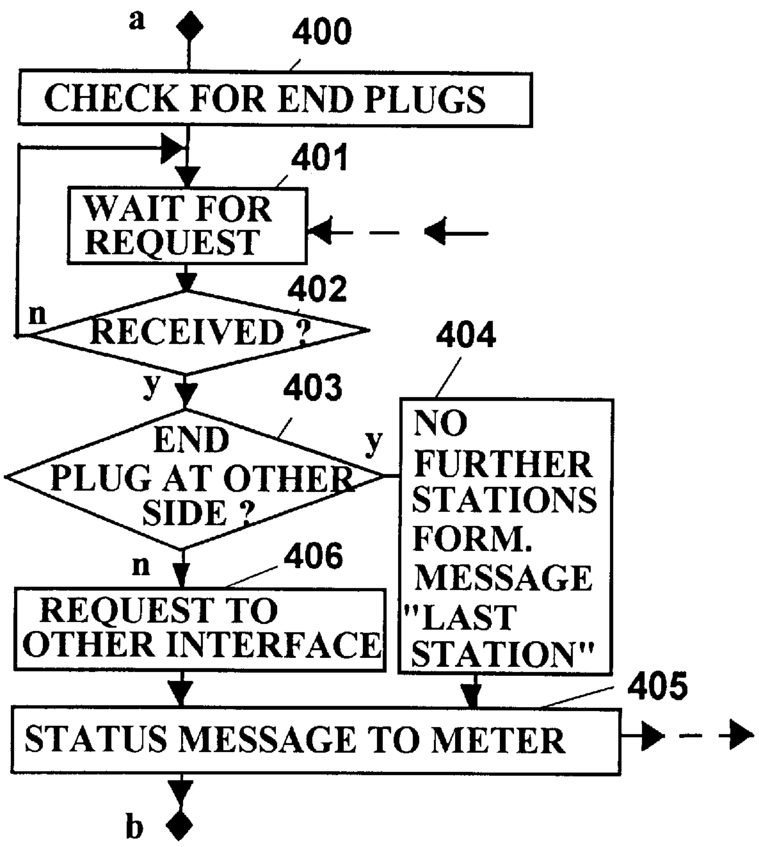
FIG. 5 is a flow chart showing the operation of a peripheral device given a communication via the V24 interface upon initialization of the station of the inventive mail processing machine.
Figure 6:
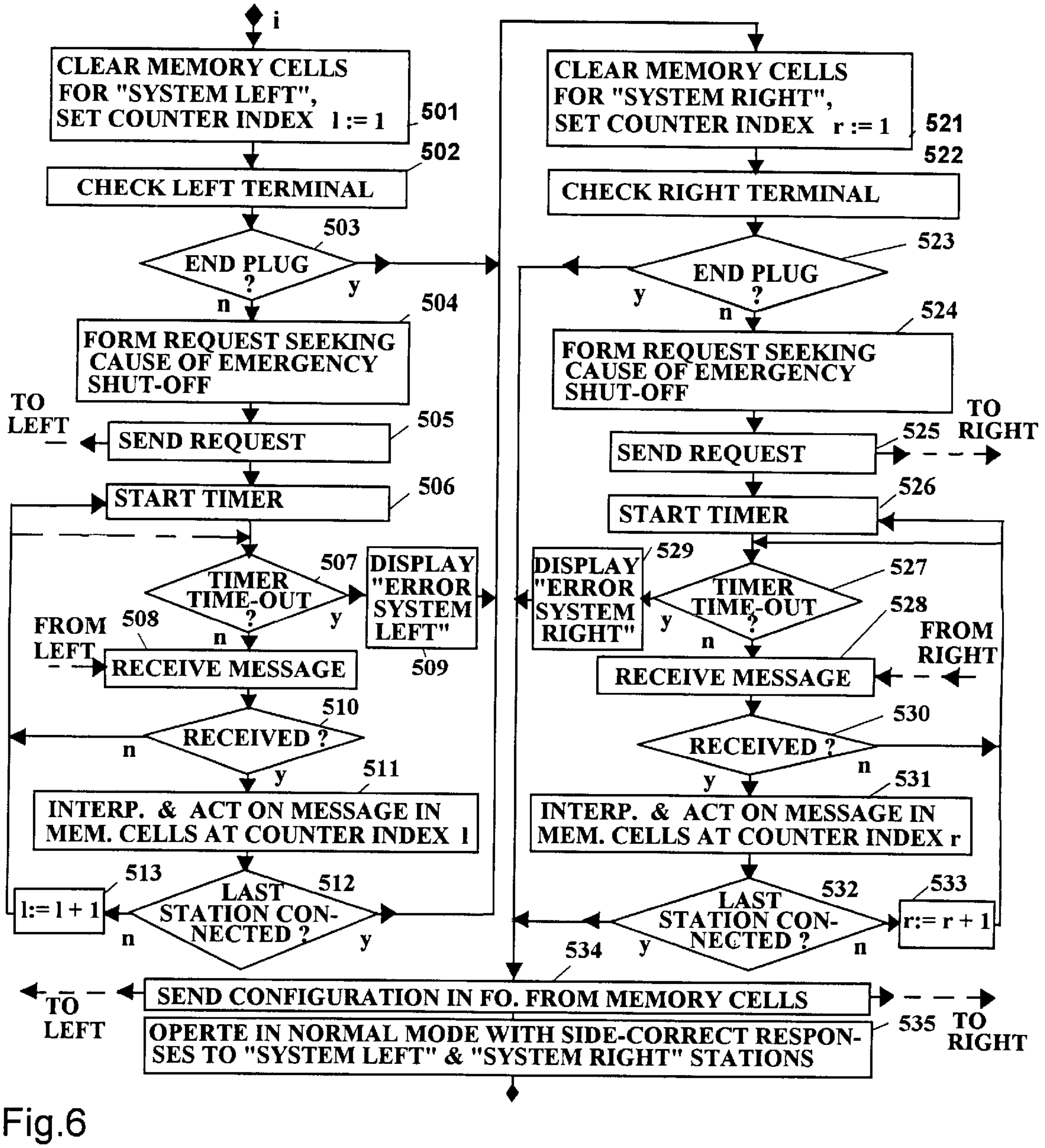
FIG. 6 is flow chart showing the operation of the meter in a communication via the V24 interface upon initialization of the inventive mail processing machine.

All stations must be operational in order to ensure the functionability of the system. During the turn-on phase, the emergency off-line is kept activated until all devices, including the postage meter machine, are supplied with voltage an the processor has assumed a defined condition. Subsequently, the postage meter machine (meter) initiates a status interrogation of the connected stations, this being shown in greater detail with reference to FIGS. 5 and 6. The postage meter machine first sends an inquiry (FIG. 6) to the first device. When the device has replied to the postage meter machine, it forward the status interrogation to the next device (FIG. 5). The last device in the sequence also communicates an end of system information to the postage meter machine in addition to its status information. When the postage meter machine now has the exact system configuration, then this is communicated to all connected devices with a broadcast (message to all) (FIG. 6). Moreover, the maximum parameters (maximum thickness, maximum width, maximum length, maximum speed, maximum weight) is communicated to all periphery modules. These are the parameters with which the system does not yet suffer any mechanical damage.

The sender and recipient identifier are respectively composed of eight bits. The first five bits indicate what is referred to as the main group and the last three bits indicate what is referred to as the sub-group of the respective device type. The individual device types of the system are identified in the main group. The sub-group number is used, given a system with more than one identical station, to number these stations beginning with zero (for example, a number of stacked boxes that are series-connected). In the normal case, the sub-group is always zero.

The status message supplies information that are not involved in the error statistics, such as, for example: station is free. Status messages are generated in the respective station.

Error messages of the respective station are stored in the error statistics of the postage meter machine. Error messages are generated in the respective station.

Data are specific information of the respective station and are generated by the station.

Commands initiate the receiving stations to an action. Command are sent to the respective stations.

Figure 8:
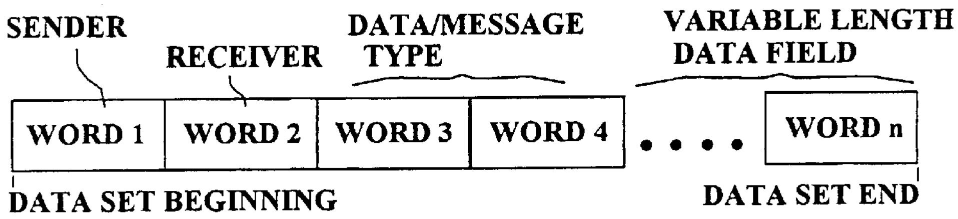
FIG. 8 illustrates a data set for the communication via the V24 interface.

FIG. 8 shows a data set for the communication via the V24 interface. A first word 1 is a field for the sender of the data or message. A second word 2 is a field for the recipient of the data or message. Third and fourth words 3 and are respective fields for the type of data or the type of message. The number of words in the fifth data field is variable (word 5 through n).

The length of a data set is coded in a nibble and indicates how many 16-bit words are sent according to the message type. The length value can lie between 0 and 15. The shortest data set, including header, thus comprises four bytes and the longest data set comprises 34 bytes. The message code occupies the last byte of the message type.

Figure 3B:
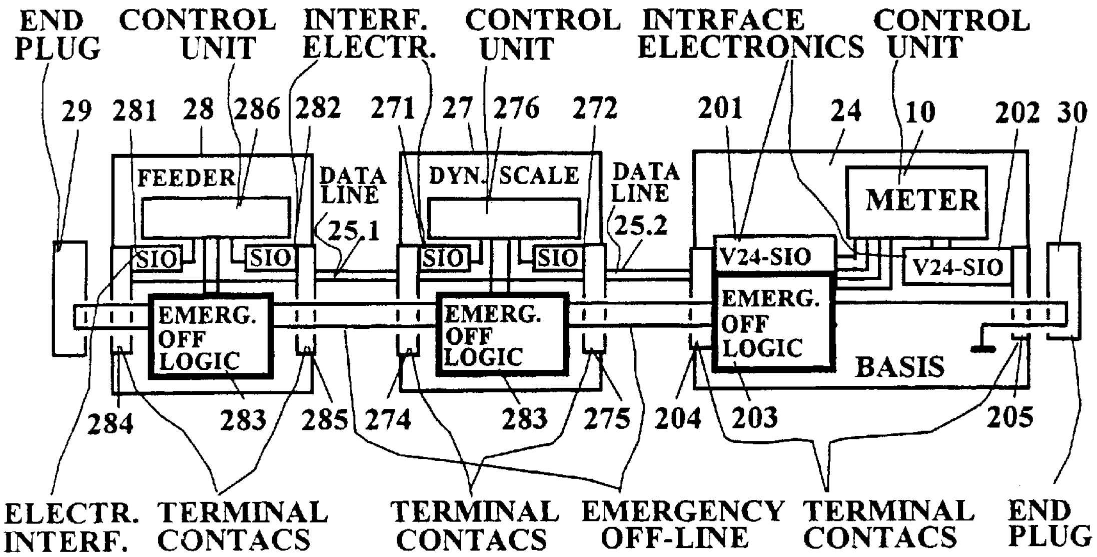
FIG. 3*b* is a block circuit diagram of the second version according to FIG. 2*b*.

FIG. 3*b* shows a block circuit diagram for the second version according to FIG. 2*b*.The meter 10 is equipped with two terminal contacts 204 and 205. An end plug 30 is plugged onto the terminal contact means 205 and terminates the system toward the right. The meter 10 is connected via terminal contact 204 toward the left with the first (right) terminal contact 275 of a dynamic scale 27, a data cable 25.2 being employed. The dynamic scale 27 likewise has a second (left) terminal contact 274 and is connected to the first (right) terminal contact 285 of an automatic feeder station 28, a data cable 25.1 being employed. An end plug 29 is pugged onto its second (left) terminal contact 275 and terminates the system. The meter 10 is connected to an emergency off-logic 203 in the base station 24. The base stations 28 and 27 are likewise each equipped with respective emergency off-logic 273 and 283 that are in turn connected to control units 276 and 286. V24 level converters and V24-SIO circuits (a UART circuit) are provided between the controls and the respective terminal contacts.

Figure 3C:
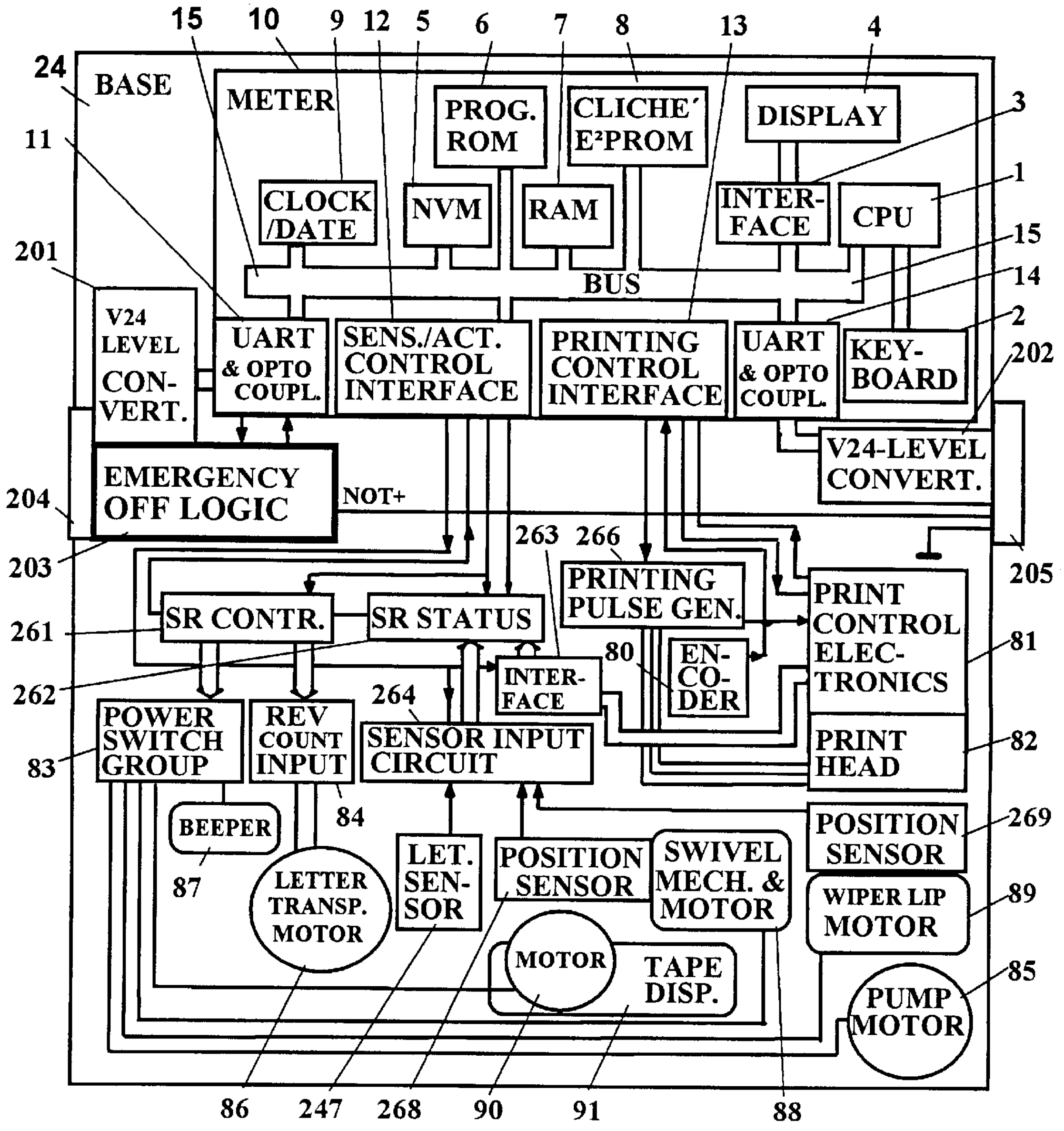
FIG. 3*c* is a block circuit diagram of the inventive postage meter machine base station with a meter.

The details of the arrangement are explained with reference to FIG. 3*c*. The meter 10 contains a central processing unit CPU 1, keyboard 2 and a display unit 4 with an interface 3, non-volatile memory 5, a program memory 6, a main memory 7, a programmable memory 8 for slogans and for the postage fee schedule tables as well as a time/date module 9. The meter 10 also contains at least the following components: a first, slow serial interface 11, medium-speed serial interface 12 for the system to the left and printhead control interface 13. Inventively, this structure is equipped with a second, slow serial interface 14 for the system at the right. The aforementioned components are coupled to one another via a bus 15.

Inventively, it is also provided that a V24 level converter L201 and an emergency off-logic 203 in the base station 24 is connected to the first, slow serial interface 11 of the meter 10.

The fast serial interface 13 is fashioned as a specific data transmission unit for fast, serial data transmission to the printhead electronics 81 in the postage meter machine base station 24, the serial interface 13 leads directly to the print control electronics 81 via opto-coupler and the TTL high-speed channel.

In addition to containing the high-speed channel, the postage meter machine base station 24 also has a printing pulse generator 266, that the high-speed channel being connected to the printhead electronics 81. The printing pulse generator 266 has an input side connected to an encoder means 80 and an output side connected to the printhead modules of the printhead 82. At least one print signal is applied to the printing pulse generator 266 via the high-speed channel when the sensor 247 detects the start of an envelope or other piece of mail, or the start of a franking tape. Shift registers that are coupled to the serial high-speed channel in order to receive at least the printing data of a print column are likewise arranged in the printhead electronics 81.

Figure 9:
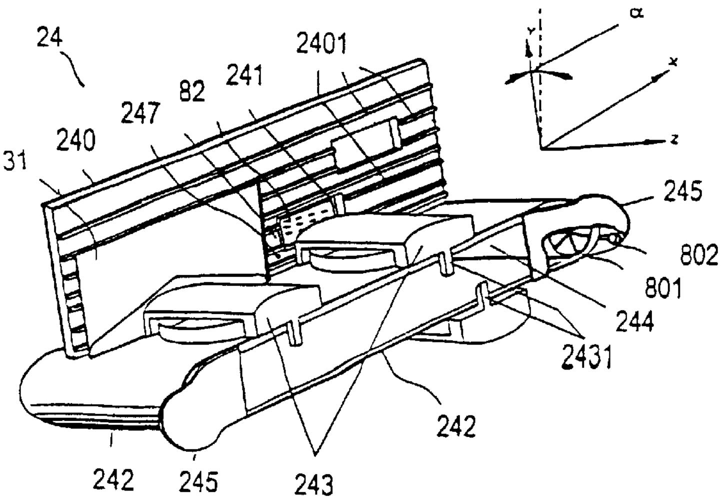
FIG. 9 is a view of the conveyor in the postage meter machine base station.

The printhead electronics 81 is connected to an encoder 80 that emits a signal corresponding to the letter conveying speed. FIG. 9 shows a postage meter machine base unit 24 with a letter 31 as well as a means for upright letter conveying a disk 801 and a photocell 802 of the encoder 80 and the franking printhead 82. The incremental sensor disk 801 that interacts with the photocell 802 and is coupled to the drive drum 244.

The encoder signal is additionally communicated via the high-speed channel to the meter 10 that communicates a clock signal via the high-speed channel for the shift registers of the high-speed channel to the fast serial/parallel conversion of the data for the printhead electronics 81.

The medium-speed serial interface 12 is equipped with the sensor/actuator control and with opto-couplers and leads to the shift register status 262 as well as to the shift register control 261 that undertake a serial-to-parallel conversion. This ensues in order to interrogate the status of the following assembles: print control electronics 81, letter sensor 247, position sensor 268 of the swivel mechanism (letter flipping) 88 and position sensor 269 of the wiper lip motor 89, as well as in order to charge the actuators (in this embodiment the letter transport motor 86, a beeper 87 operated by a performance monitoring switch 83, the swivel mechanism 88 and its motor, the wiper lip motor 89 and a motor 90 for the tape dispenser 91) with corresponding control signals. The data line containing at least the series circuit of shift register control 261 ans shift register status 262 is connected to the other serial data line in order to form a closed loop.

The franking printhead 82 is preferably implemented as a dot-matrix printer in order to be able print changing information, for example, different customer slogans. The piezo-ink jet method is a particularly suitable printing process. Due to its high printing speed, it also allows for processing of large quantities of letters. Such a printhead is disclosed in detail in U.S. Pat. No. 5,592,203. In order to allow the printer to print different letter thicknesses with identical quality, an arrangement is disclosed in German Application 196 05 146.6 for the conveying and printer means for a version of the postage meter machine base station.

The aforementioned, slow serial interface 11 is likewise equipped with UART electronics and with opto-couplers and serves for the control of the stations to the left of the base 24.

The transmission circuit 201 for the slow channel contains a level converter in order to convert the TTL level into a V24 level. A jack 24 is connected to this level converter and advantageously carries the V24 level. A further station 27 or 28 can be connected to the jack 204, whereby all are equipped with V24 interfaces in a standard fashion.

The automatic feeder 28 thus is connected in terms of interface to the dynamic scale 27 via data cable 25.1 as an interface and the dynamic scale 27 is connected to the postage meter machine base 24 via data cable 25.2 as an interface. The postage meter machine base unit 24 interfaces with the meter 10. It is advantageous that the lines of the serial interface and the separate lines are combined in a single data cable 25 that is connected via a plug/socket with the specific V24 interface unit 26 in the postage meter machine base station 24.

Whereas the stations 27, 28 and 24 of the mail processing machine 20 communicate with one another via a serial V24 interface and data cable 25 (or cables 25.1 and 25.2) with a data rate of 9600 Bd, the significantly higher data rate is achieved by the meter 10 via a manipulation-proof, specific TTL high-speed interface. In addition to the communication of printing data, this also allows the communication of further data for a communication with the postage meter machine base station 24. For example, a data rate of 1,000,000 Bd is achieved in the data transfer between meter 10 and postage meter machine base station 24.

Figure 3D:
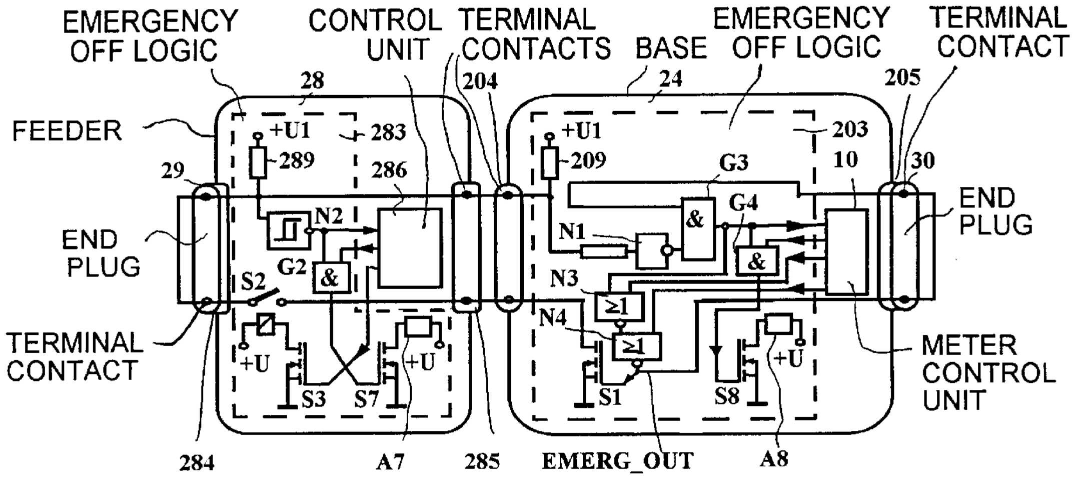
FIGS. 3*d* and 3*e* show circuits for an emergency off-logic in accordance with the invention.

FIG. 3*d* shows a preferred circuit arrangement of the emergency off-logic. In an emergency, the emergency off-logic 283 in the peripheral device 28 serves for an expedient shutdown of the system. The end plug 29 is arranged at the outside left in the system and connects the emergency off-lines NOT− through NOT+ to form a current loop. The emergency off-lines NOT− through NOT+ are conducted through the emergency off-logic 283 such that the loop can be interrupted by a switch S2. A pullsup resistor 289 is arranged between a positive voltage +U1 and the emergency off-line NOT+. The input of a Schmitt trigger N2, that signals the level change when the emergency off interrogation is implemented, is connected to the junction with the emergency off-line NOT+. An input of the control unit 286 is connected to the output of the Schmitt trigger N2. An input of an AND gate G2 is at the output of the Schmitt trigger N2. Given level change from H (normal case) to L (emergency) of the output of the Schmitt trigger N2, the AND gate G2 switches a driver transistor S7 off, and thus also switches off an actuator A7. Additionally, a shut-off of the actuator A7 can be triggered via a second input of the AND gate G2 by the CPU in the control unit 286 of the station 28, by the L level being applied to the second input of the AND gate G2. A number of actuators A1 through A7 can be shut off by additional AND gates and driver transistors that operate in the same way. Loaders which are driven via actuators or directly are also within the term “actuators” as used herein. A letter conveying motion is interrupted by a shut-off of the motors. An emergency shut-off can be undertaken by the emergency off-logic dependent on the operation of the CPU in the control. The control is connected to sensors (not shown) that signal malfunctions in the station 28. An output of the control unit 286 is connected to the input of the electronic switch S3 that actuates the switch S2 via a relay. The electronic switch S3 is preferably a field effect transistor. The winding of the relay is connected to the output of the field effect transistor and to another or to the same positive voltage +U. Alternatively, the control has a power output and can directly actuate the switch S2 via the relay 287 (FIG. 3*a*). In case of malfunction, the CPU in the control 286 opens the switch S2 via the electronic switch S3 and the connected relay and thus interrupts the emergency off-line NOT−. The level change on the emergency off-line NOT+ can be detected in the other stations. Where the contacts of the switch S2 of the relay 287 are closed in the emergency off-logic 283 of the automatic feeder station 28, then the current loop is also closed. When the emergency off-line NOT− coming from the postage meter machine base station 24 is at ground potential (low), then the emergency off-line NOT+ leading to the postage meter machine base station 24 also is at the same potential. Otherwise, a pull-up resistor 289 pulls the potential of the emergency off-line NOT+ leading to the postage meter machine base station 24 to plus (high). This is likewise the case when the stations are electrically disconnected. At the left side of the system, the Schmitt trigger N2 signals the level chain to the control 286.

The emergency off-logic 203 of the postage meter machine base station 24 includes a switch S1 in the emergency off-line NOT−. A suitable electronic switch, for example a transistor, is preferably utilized that applies ground potential to the emergency off-line NOT− when it is driven. A pull-up resistor 209 is arranged between plus voltage and the emergency off-line NOT+. The series-connected logical gates N1 and G3 are connected to the junction point with the emergency off-line NOT+. A first input of an AND gate G4 and the inputs of the control unit 10 are connected to the output of the AND gate G3 via an input stage (not shown). Preferably, the output of the AND gate G3 is connected to the input of a shift register that stores the level change until the emergency off interrogation is implemented. Intermediately stored control signals can also be supplied via such a shift register. A second input of the AND gate G4 is connected to an output of the control unit 10 to an output of the shift register (not shown) of the control unit 10. The output of the AND gate G4 is connected to an electronic switch S8 that controls an actuator A8. In case of emergency off, the actuator A8 is switched free of current via the logic gates G3 and G4 as well as the electronic switch S8. Further actuators or motors can be shut off via further logic dates and electronic switches that are not shown.

At least one further output of the control unit 10 is connected via logic gates N3 and N4 to the input of the electronic switch S1. Preferably, two NOR gates N3 and N4 are utilized. The output of the NOR gate N4 supplies the signal H on the control line EMERG_OUT in order to drive the electronic switch S1 and in order, thus, to apply ground potential to the emergency NOT−. The logic gate N1 is an inverter that applies the inverted input signal to the first input of the AND gate N3. The control line EMERG_OUT produces a connection to the second input of the AND gate N3 via the end plug 30. When the end plug is removed or when the emergency occurs in the system, i.e. a level change is signaled via the emergency off-line NOT+ to the postage meter machine base station 24, then a level change HL also ensues at the output of the AND gate G3. The signal is inverted twice via the two NOR gates N3 and N4. The level L thus again proceeds to the control input of the electronic switch S1, which shuts off in response thereto. The two NOR gates N3 and N4 are connected in series and are employed for the actuation of the electronic switch S1 by the CPU of the control 10, or for the re-activation. The latter only ensues when the malfunctions have been eliminated. The respective second inputs of the NOR gates N4 and N3 are connected to separate outputs of the control unit 10.

When the system is to be expanded by further stations at the right, this version of the circuit is supplemented by a further circuit part. A suitable circuit modification in shown in FIG. 3*e*. The second input of the AND gate G3 of the emergency off-logic 203 lies at the output of a further logical gate N5 that is likewise an inverter, which applies the inverted input signal, to the second input of the AND gate G3. The input signal is supplied from the emergency off-line NOT+ at the right in the system and is L (low) in the normal case but H (high) in case of an emergency. A connection from the emergency off-line NOT+ to the emergency off-line NOT− is produced via the end plug 30 that is arranged at the extreme right in the system. In the normal case, the signal L is present on the emergency off-line NOT+, this being applied via an electronic switch S4 to the emergency off-line NOT− for the (at least one) station 23 which is arranged at the right in the system. With respect to communication, the latter has a fundamentally identical structure as the station 28 arranged at the left in the aforementioned system. In case of an emergency, the signal L is present on the emergency off-line NOT+ in order to be inverted with a Schmitt trigger N6 and to then shut off a further electronic switch S9 via a logic gate G6. The switch S9 shuts off an actuator A9 or a motor (not shown).

The output of the AND gate G3 is connected via the two NOR gates N3 and N4 and a control line (EMERG_OUT) to the control input of the electronic switch S1 and to the control input of a further electronic switch S4 for supplying the stations arranged at the right in the system with an identical off-line NOT−. In the normal case, the potential H is on the control line EMERG_OUT, and thus ground potential L is applied to the emergency off-line NOT− in the system at the right. The signal on the control line EMERG_OUT, inverted by the electronic switch S4, is thus conducted back and forth via the stations at the right and, inverted again by the gate N5, is then applied to the second input of the AND gate G3. In this version, the station 23' is an intelligent peripheral device having its own control unit 236. When sensors (not shown) of the control unit 236 of the station 23 report an emergency, this controls an electronic switch S6 in the station 23' such that the potential H now is on the looped-back emergency off-line NOT+. This can ensue by opening a switch contact S5 lying in the emergency off-line NOT−. The potential L then is on the control line EMERG_OUT. Both electronic switches S1 and S4 thus switch off. This switch-off again causes a level change that is also detected in the aforementioned station 28 arranged at the left in the system.

Preferably, the emergency off-logic 233 for the station 23' and all other stations connected to the postage meter machine base station can be identically constructed. In addition to the emergency off-line, further communication lines that are connected to the respective interface electronics lie in the terminal contact(284 and 285; 274 and 275; 204 and 205; 234 and 235). Preferably identically fashioned interface electronics 281 and 282, 271 and 272, 201 and 201, 231 and 232 for the communication toward the left and right are preferably arranged between the terminal contact means and the respective control unit. For simplification, this interface electronics is not shown in FIGS. 3*d* and 3*e*. In FIGS. 3*a* or 3*b*, respectively, this interface electronics was only shown for a system having one or two intelligent stations to the left of the base station. It is within the scope of the invention to utilize the aforementioned emergency off logic with emergency off-line and/or interface electronics in a system having only one or two intelligent stations to the "right" of the base station 24 and to employ other communication means only at the "left" of the base station 24.

It is inventively provided that the stations are equipped with communication elements 281, 284 and 282, 285; 271, 274 and 272, 275; 201, 204 and 202, 205; 231, 234 and 232, 235 corresponding to the two directions of left and right to the immediately neighboring stations, and that the stations 23', 24, 27, 28 have control units 10, 236, 276, 286, respectively that are programmed to interpret the message incoming at the one interface or to forward it to the other interface when it is not directed to the receiving station. The mail processing machine is fashioned expandible toward both sides in unlimited fashion. A status line is looped through the stations as an emergency off-line, and an emergency off-logic and control is provided in the stations, whereby the control units 10, 236, 276, 286 are correspondingly fashioned so that an emergency shut-off of the actuators of the other stations can be activated via the emergency off-line by every station. The control is connected to the outgoing emergency off-line NOT−, and that the emergency off-logic 203, 233, 273, 283 of the respective stations 23', 24, 27, 28 is connected to the returning emergency off-line NOT+ and to at least one actuator A1. . . , A7, A8, A9 of the station.

In another version each station is correspondingly fashioned at least with communication means and with an emergency off-logic having emergency off-line. The emergency off-logic includes at least one circuit for emergency off interrogation and the driver means for the drive of an actuator. Further, a correspondingly effective adaptor can be utilized as intermediate station instead of the connecting cable. The transition between two mail-processing stations that are not immediately adjacent to one another in the mail stream can be accomplished by such a station.

It is also inventively provided that a station at the start or end of the mail stream, i.e. at the extreme left or right end of the system, is fashioned with at least one emergency off-logic with an emergency Be. As shown in FIGS. 2*a* and 2*b*,it is thus possible that the station at the end is, for example, only a deposit 23 for pieces of mail that, however, corresponds to an end plug 30 in terms of circuit technology, as was already explained with reference to FIG. 3*e*.

Figure 4:
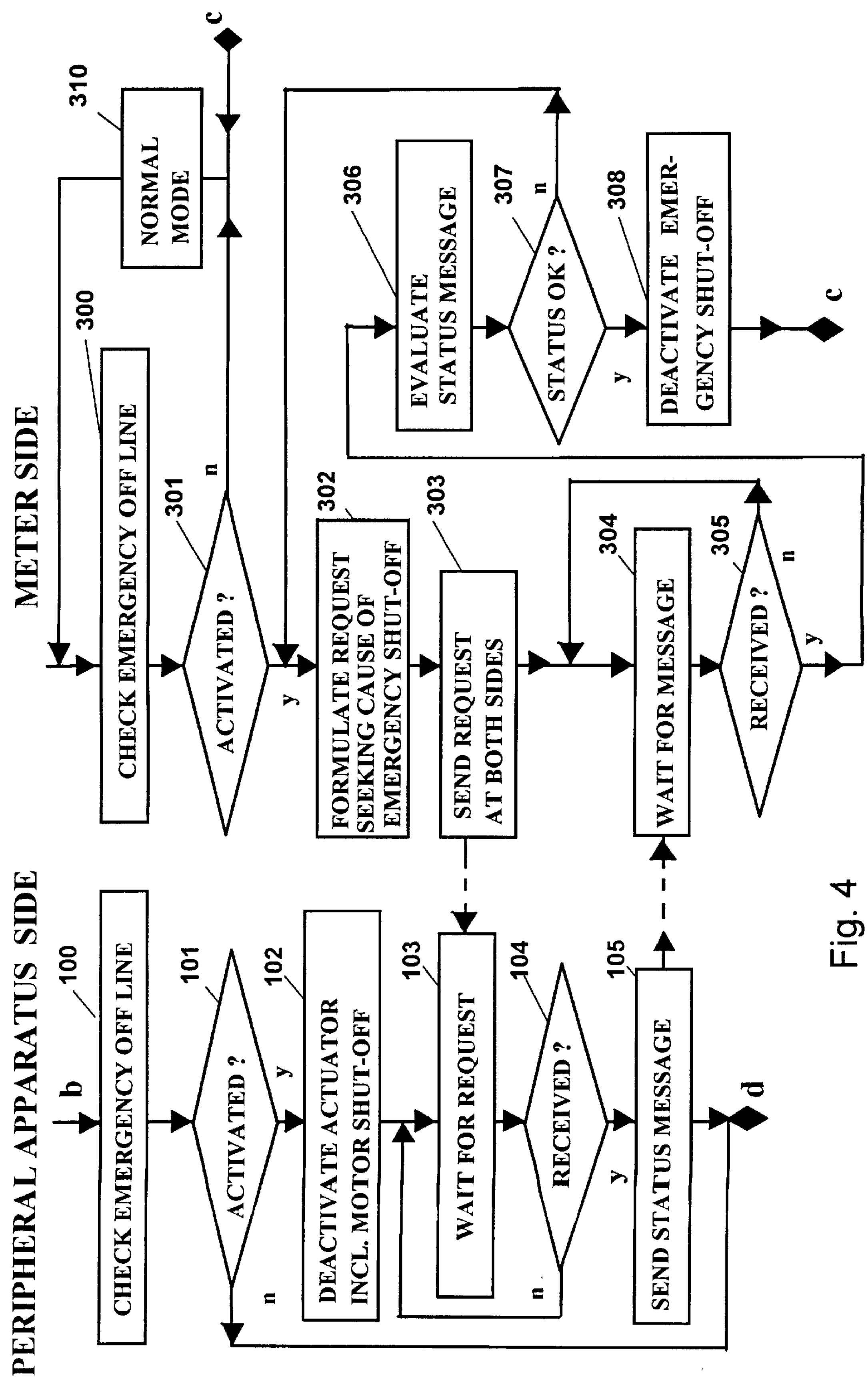
FIG. 4 is a flow chart for the effect of an emergency shutdown in the inventive mail processing machine.

FIG. 4 shows a flow chart for the effect of the emergency shut-off in the mail processing machine, preferably for a station 28 that is in a communicative connection with the meter 10. The station 28 is an intelligent periphery device. In step 100, a check of the emergency off-line occurs at the side of the periphery device, wherein the emergency off-logic determines that the emergency off-line NOT+ or NOT− has been interrupted and signals this with an interrupt at the appertaining control of an intelligent periphery device. Given activation, a branch is made from the step 101 to the step 102 in order to immediately deactivate the actuators or in order to stop the motors. A wait in the following step 103 is made for a request that is sent from the meter 10. When the request is received in the step 104, a status message is sent to the meter 10 in the postage meter machine base station 24 in the step 105. Otherwise, a branch is made back to the step 103 in order to wait for the request. After the output of the status message to the meter 10 in the step 105, point d, and thus the normal mode (normal operation in step 110), is reached. Such a normal operation in step 1 10 is explained with reference to FIG. 7.

Parallel to the execution of the routine for the emergency shut-off in the station 28 of the mail processing machine, a routine for emergency shut-off in steps 300 through 308 likewise is executed in the meter 10, this routine ending with the emergency shut-off being deactivated in the step 308, when all stations of the mail processing machine 24 are error-free. First, the status of the emergency off-line is again checked (emergency interrogation circuit 208). If the meter 10 finds in step 301 (meter 10 via the means 11 and 114) that no activation ensues, point c, and thus the normal mode (normal operating condition in step 310), is reached in order to control the mail processing machine 20. Otherwise, given activation (identified in step 301), the motors or actuators 86–90 are shut-off or deactivated and a request for seeking the cause of the emergency shut-off is formed in step 302 and, in step 303, this request is forwarded to both sides (left and right) to the periphery devices, particularly to the stations 27 and 28. After waiting for a message from the stations in the steps 304 and 305, a branch is made to the step 306 for the interpretation of the status message given reception of such a message. When the status is ok, this being checked in step 307, the step 308 is reached in order to deactivate the emergency shut-off. Otherwise, a branch is made back to the step 302.

FIG. 5 shows a flow chart directed to the operation given a communication via the V24 interface upon initialization of the stations of the mail processing machine. An initialization of the stations was implemented before the emergency shut-off routine according to FIG. 4 in order to restore a defined status of the stations. After checking for end plugs in step 401 that are plugged on, a wait is made in steps 401 and 402 for request data in order to then branch to the step 403, where a check is made as to whether an end plug is plugged to the other side of the station. In such a case wherein an end plug is also plugged to the other side of the station, the information "last device" is formed in the step 404 based on the fact that no further station is connected. When no end plug is plugged on at the other side of the station, a request is formed in the step 406 that is sent to the other interface. Following these steps 404 and 406, respectively, the status of the device is reported to the meter 10 in the step 405.

FIG. 6 shows a flow chart directed to the operation of the meter given a communication via the V24 interface upon initialization of at least one station of the mail processing machine. The flow chart is shown self-explanatory in steps 501 through 535. In steps 501 through 512, information is collected about the system to the left of the base station 24 and information about the system to the right of the base station 24 is collected in the steps 513 through 533. The information is stored in the meter 10 in corresponding "left" and "right" memory cells of the non-volatile memory 5. Subsequently, a branch is made to the step 534 in order to send the device configuration information from the memory cells toward both sides via the serial interfaces. Upon switching to the normal mode (with step 535), a side-correct response of the stations proceeding from the meter is guaranteed in the future, i.e. stations that are located at the left or right in the system.

Figure 7:
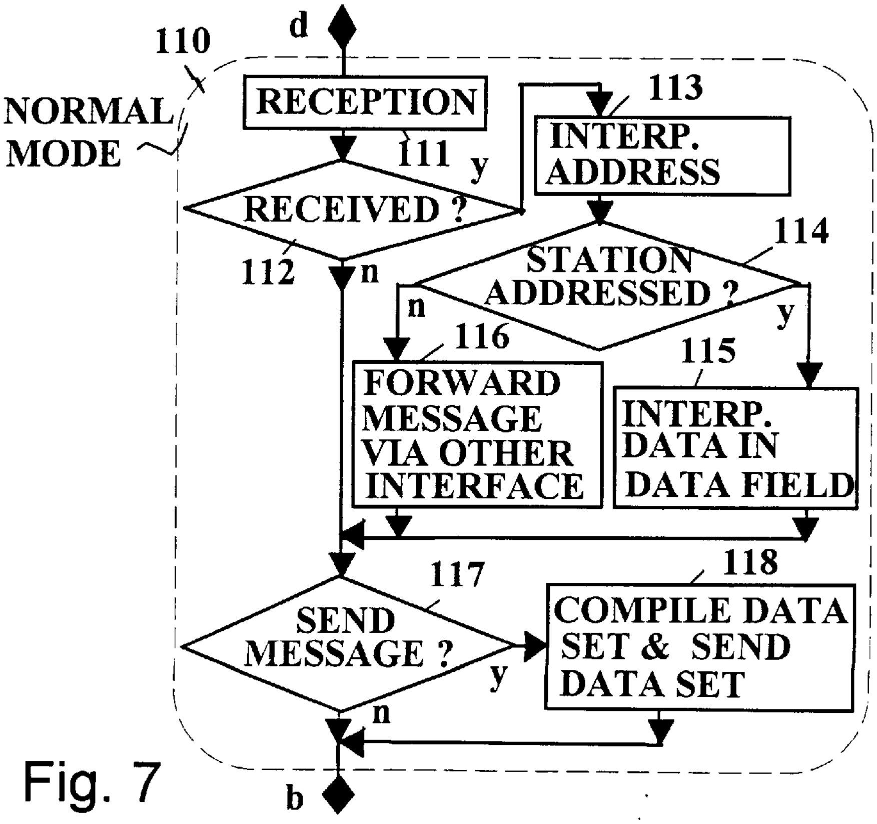
FIG. 7 is a flow chart showing the operation of a controller of a station given a communication via the V24 interface in the normal mode.

FIG. 7 shows a flow chart directed to the operation of a control of a station given a communication via the V24 interface in the normal mode 110. After the reception 111 of a message, a branch is made via the step 112 for interrogation as to whether a message was received, step 113 interpret address, 114 for interrogation whether the device was addressed, and step 115 for evaluating data or step 116 for forwarding data, this branch being made to an interrogation step 117. When a transmission to a station or the meter 10 is necessary, a branch is made from the step 117 to the step 118 in order to correspondingly compile a data set. Subsequently, the point b is reached. A branch is thus made from the normal mode 110 onto the step 100 in FIG. 4 in order to check the signal status on the emergency off-line.

Figure 3E:
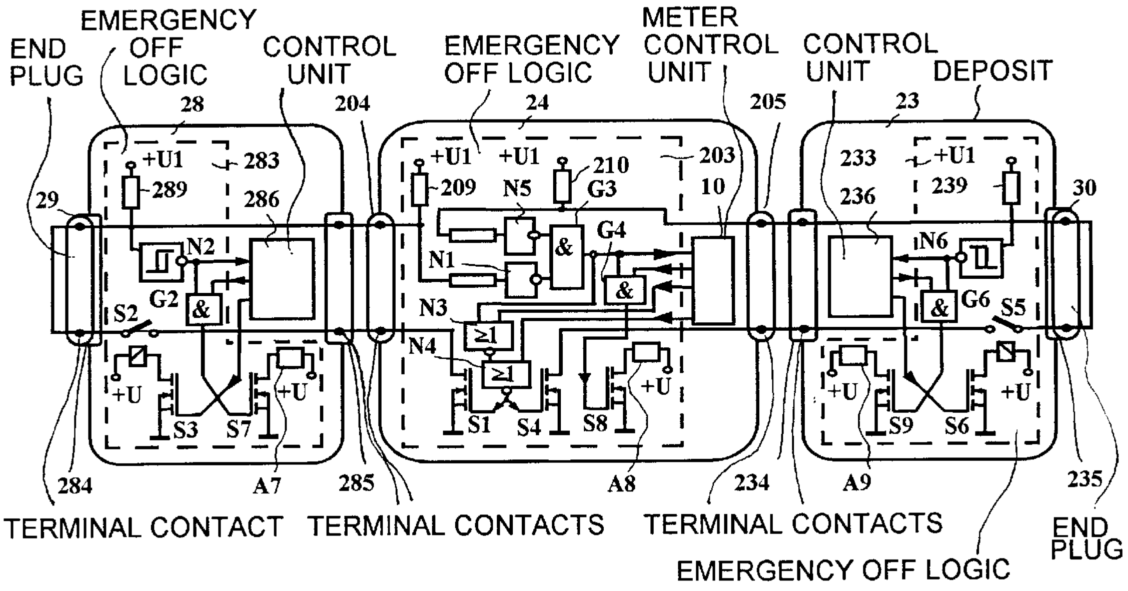

The appertaining logic with specific means for emergency off interrogation was already explained with reference to FIGS. 3*d* and 3*e*. The means for emergency off interrogation 208 or 288 in the postage meter machine base station 24 or periphery device are likewise shown in FIG. 3*a* and, alternatively, can also be realized with different components in order to achieve the same effect as a final result.

A personal computer or a specific electronic peripheral device can be linked into the system, this maintaining specific statistics for the implemented frankings. For example, the statistics can be maintained by departments. To that end, the personal computer can be correspondingly coupled to the meter 10. A coupling of an intelligent deposit 23' to the aforementioned personal computer can also ensue. The control unit of the personal computer is programmed to interpret the incoming message or to forward it to the other interface (printer interface) when it is not directed to the receiving station. For example, the latter station can be a printer for statistics. Since no mail stream is conducted across the personal computer and since maintaining statistics has no effect on the mail stream in the sense of a jam or other malfunctions, conducting the emergency off loop over the aforementioned personal computer or a statistics printer connected thereto can be entirely eliminated. The emergency off loop is then only conducted to the deposit 23 or up to the end plug 30 of the deposit 23'.

Further, an embodiment without aforementioned communication means but with an emergency off logic an with an emergency off-line is provided at least for some of the stations arranged at the end side. An expanded embodiment with a turn-on line is provided at least at some stations arranged in the system.

Of course, the application of the invention is not limited to letter mail. The franking printer 82 can also print a label that is glued onto a package by a further station.

Although modifications and changes may be suggested by those skilled in the art, it is the intention of the inventors to embody within the patent warranted hereon all changes and modifications as reasonably and properly come within the scope of their contribution to the art.

We claim as our invention:

1. In a mail processing machine having a plurality of successive mail handling stations, each station containing at least one actuator, the improvement of an arrangement for communicating among said stations comprising:

each station having first communication means for interfacing with a first neighboring station on a first side toward a first direction, and second communication means for interfacing with a second neighboring station on a second side toward a second direction;

at least one of said stations including means for producing a directed message;

each station containing control means for identifying said directed message, incoming via one of its first or second communication means, as being directed to that station and, if so, for interpreting said message, or as being directed to another of said stations and, if so, for forwarding said message to one of said first or second neighboring stations respectively via the other of its first or second communication means;

said stations being separably connected in succession for unlimited expansion of a number of said stations in either of said directions;

an emergency off-line looped through all of said stations via the respective first and second communication means of said stations;

each station containing emergency off logic connecting the control means in that station to said emergency off-line and connecting said control means in that station to said at least one actuator in that station; and said control means in each station comprising means for producing an emergency off signal directed via said emergency off-line to every station for causing each control means, in each station, to immediately shut off every actuator connected thereto via the emergency off logic in the station.

2. The improvement of claim 1 wherein each of said first communication means and said second communication means in each station comprise:

a plurality of electrical terminal contacts; and interface electronics, identical in every first communication means and second communication means, electrically connected between said plurality of electrical terminal contacts and the respective control means in the station containing said first and second communication means.

3. The improvement of claim 2 wherein said interface electronics comprises serial interface electronics, wherein one of said stations comprises a postage meter machine base station, and wherein the control means in said postage meter machine base station comprises means, after initialization of said mail processing machine, for sending a directed message to all of said stations identifying a configuration of the stations for setting the respective serial interface electronics in each station.

4. The improvement of claim 3 wherein said stations include at least one individually controllable station, and a data cable connecting said individually controllable station to one other of said stations.

5. The improvement of claim 4 wherein said individually controllable station comprises an automatic feeder for postal matter connected via said data cable to said postage meter machine base station, and wherein said control means in said postage meter machine base station comprises means for controlling said postage meter machine base station and said automatic feeder station, said postage meter machine base station having a mail input and said automatic feeder station comprising means for automatically supplying an envelope to said mail input.

6. The improvement of claim 5 further comprising a dynamic scale connected via a further first data cable to said automatic feeder station and connected via a further second data cable to said postage meter machine base station.

7. The improvement of claim 4 wherein said individually controllable station comprises a dynamic scale connected via a data cable to said postage meter machine base station.

8. The improvement of claim 1 wherein one of said stations comprises a postage meter machine base station comprising a printhead for printing on items of postal matter, an encoder which identifies when an item of postal matter is present for printing thereon, a printing pulse generator supplied with a signal from said encoder, and printhead electronics supplied with a pulse from said printing pulse generator, and an interface unit having a high-speed channel connected to said printhead electronics.

9. The improvement of claim 1 wherein the emergency off logic in each station comprises means for interrogating said emergency off-line for determining whether said emergency off signal exists on said emergency off-line, and driver means for driving said at least one actuator in that station.

10. In a mail processing machine having a plurality of successive mail handling stations, each station containing at least one actuator, the improvement of an arrangement for communicating among said stations comprising:

each station having first communication means for interfacing with a first neighboring station on a first side toward a first direction, and second communication means for interfacing with a second neighboring station on a second side toward a second direction;

at least one of said stations including means for producing a directed message;

each station containing control means for identifying said directed message, incoming via one of its first or second communication means, as being directed to that station and, if so, for interpreting said message, or as being directed to another of said stations and, if so, for forwarding said message to one of said first or second neighboring stations respectively via the other of its first or second communication means; and said stations being separably connected in succession for unlimited expansion of a number of said stations in either of said directions.

11. In a mail processing machine having a plurality of successive mail handling stations, each station containing at least one actuator, the improvement of an arrangement for communicating among said stations comprising:

each station having first communication means for interfacing with a first neighboring station on a first side toward a first direction, and second communication means for interfacing with a second neighboring station on a second side toward a second direction;

said stations being separably connected in succession for unlimited expansion of a number of said stations in either of said directions;

an emergency off-line looped through all of said stations via the respective first and second communication means of said stations; and each station comprising means for producing an emergency off signal on said emergency off-line and including means for interrogating said emergency off-line to determine if said emergency off signal exists on said emergency off-line and, if so, for shutting off the at least one actuator in the station.

12. The improvement of claim 11 wherein one of said stations comprises a postage meter machine base station, and said improvement further comprising a single turn-on line proceeding from said postage meter machine base station to all other stations for activating said all other stations via said single turn-on line from said postage meter machine base station.

* * * * *